United States Patent

Tabata

[11] Patent Number: 6,031,674
[45] Date of Patent: Feb. 29, 2000

[54] SERVO PATTERN FORMING METHOD FOR FLOPPY DISK

[75] Inventor: Masashi Tabata, Fukushima-ken, Japan

[73] Assignee: Alps Electric, Co., Ltd., Tokyo, Japan

[21] Appl. No.: 08/921,092

[22] Filed: Aug. 28, 1997

[30] Foreign Application Priority Data

Sep. 2, 1996 [JP] Japan ................................. 8-232175

[51] Int. Cl.[7] ........................................................ G11B 5/02
[52] U.S. Cl. ........................... 360/57; 360/66; 360/77.08; 360/78.14; 360/75
[58] Field of Search ........................... 360/57, 66, 77.08, 360/78.14, 75, 51

[56] References Cited

U.S. PATENT DOCUMENTS

| | | |
|---|---|---|
| 4,688,118 | 8/1987 | Knowles et al. .......................... 360/75 |
| 4,799,115 | 1/1989 | Rogers et al. ............................. 360/66 |
| 4,998,075 | 3/1991 | Patton, III et al. .......................... 331/2 |
| 5,012,363 | 4/1991 | Mine et al. . |
| 5,164,863 | 11/1992 | Janz . |

OTHER PUBLICATIONS

Abstract of Japanese Patent No. 409223374, Aug. 26, 1997.

*Primary Examiner*—Alan Faber
*Attorney, Agent, or Firm*—Brinks Hofer Gilson & Lione

[57] ABSTRACT

A method of writing servo patterns to a floppy disk with use of a magnetic head having a head gap wider than the track pitch of the floppy disk, which method comprises writing a servo pattern to one track, thereafter moving the magnetic head by a predetermined distance in the width direction of the track to write a servo pattern, then at the time of writing servo patterns successively for a plurality of tracks in the same way as above, selecting appropriately a supply timing of write data and that of erase data to be fed to the magnetic head, and erasing in the next writing of a servo pattern a write portion of a servo pattern which deviated from the track width in the previous writing thereof.

5 Claims, 6 Drawing Sheets

SERVO PATTERN FORMING METHOD FOR FLOPPY DISK

BACKGROUND OF THE INVENTION

The present invention relates to a servo pattern forming method for a floppy disk and more particularly to a method of writing servo patterns to a floppy disk by the use of a magnetic head having a magnetic head gap wider than the track pitch of the floppy disk. This method can perform the writing without giving rise to any write overlap portion of the written servo patterns.

Generally, a servo pattern written to a disk-shaped recording medium comprises servo information and burst and is formed wider than the data track width.

Figure 7:
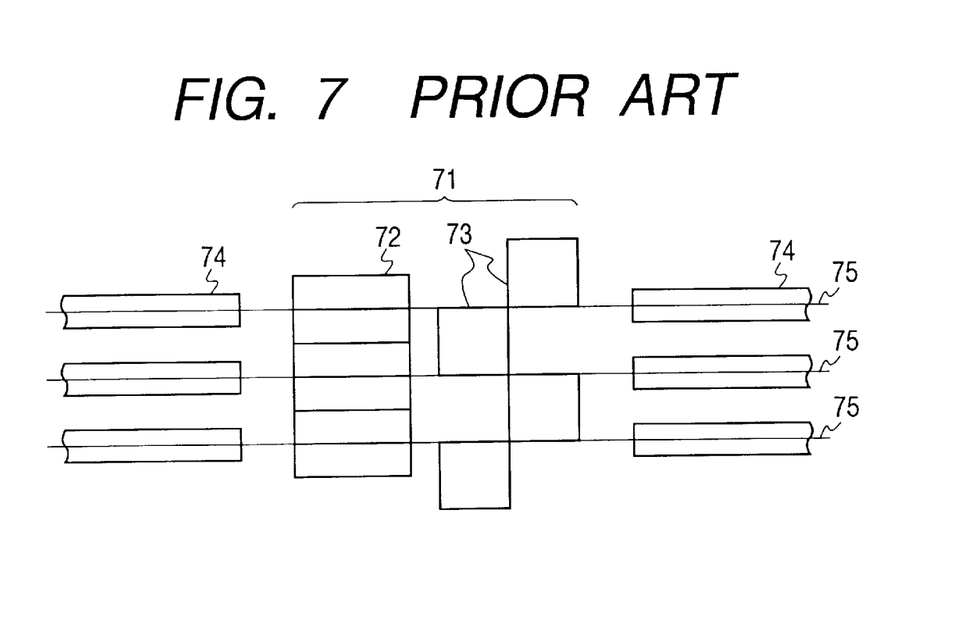
FIG. 7 is an enlarged plan view showing a configuration example of a servo pattern formed by a conventional servo pattern forming method for a floppy disk.

FIG. 7 is an enlarged plan view showing an example of configuration of such a servo pattern.

As shown in FIG. 7, a servo pattern 71 comprises servo information 72 and burst 73 and it is wider than the width of a data track 74. The servo information is written in such a manner that a center line (information center) of each information area coincides with a center line (track center) 75 of each data track 74. The burst 73 is written in such a manner that the outer and inner edges of each information area are respectively in contact with the center lines (track centers) 75 of adjacent data tracks 74.

For writing a servo pattern to a floppy disk as a disk-shaped recording medium, there usually is employed a magnetic head for read/write (R/W) which is disposed on the floppy disk drive side. The R/W magnetic head has a head gap equal to the data track width (data width) of the floppy disk. Therefore, in writing servo patterns with use of the R/W magnetic head, first a servo pattern is written to one-side portion of a single track, then the R/W magnetic head is moved a predetermined distance, that is, a half track pitch for example, in a direction perpendicular to the track (radial direction of the floppy disk), and then a servo pattern is written (overlap write) in the same position as the previously written position. In this way servo patterns are written over a predetermined width.

Figure 8:
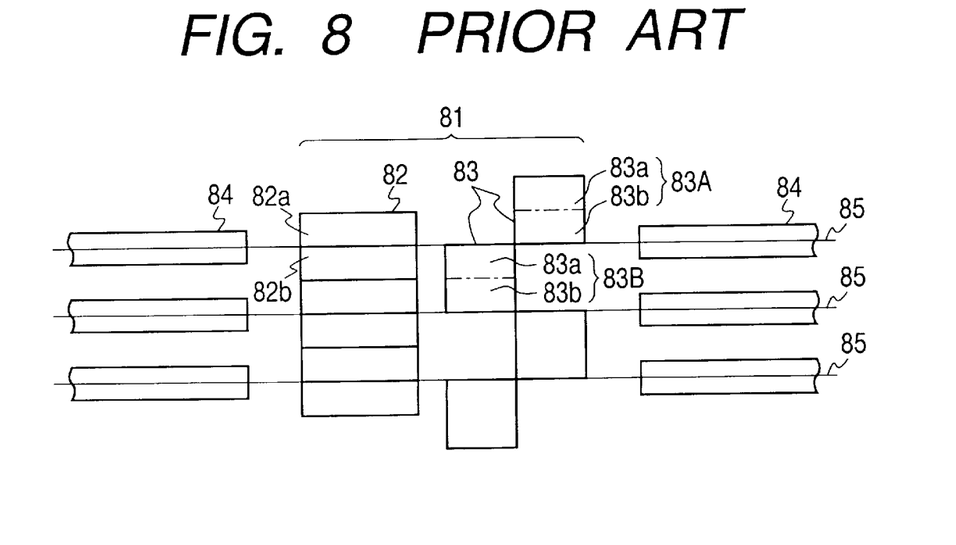
FIG. 8 is an enlarged plan view showing a configuration example of a servo pattern formed by a conventional servo pattern forming method for a floppy disk.

FIG. 8 is an enlarged plan view showing a configuration example of servo patterns performed such overlap writing.

As shown in FIG. 8, a servo pattern 8 comprises servo information 82 and burst 83. Using the R/W magnetic head, first servo information 82a and bust 83a bare written to one-side portion of a center line 85 of a data track 84. Thereafter, the R/W magnetic head is moved a half track pitch in a direction perpendicular to the data track 84 (radial direction of the floppy disk) and second servo information 82b and burst 83b are written (overlap write) in the same position as the first written position to form a servo pattern 81 wider than the data track 84. Also in this case, the servo information 82 is written in such a manner that the center line (information center) of each information area coincides with the center line (track center) 85 of each data track 84. As to the burst 83, it is written in such a manner that the outer and inner edges of each information area are respectively in contact with the center lines 85 (track centers) of adjacent data tracks 84.

According to the known servo pattern forming method for a floppy disk described above, in twice writing (overlap write) the servo pattern 81, especially burst 83, the written position of the first burst 83a and that of the second burst 83b may be shifted from each other in the track length direction, for example, due to slight unevenness in rotation of a spindle motor for rotating the floppy disk or due to external oscillations. Upon occurrence of such a positional shift, burst A (83A) located on one side of the center line 85 of the data track 84 and burst B (83B) located on the other side are not always equal to each other with respect to the amount of information, thus giving rise to the problem that it is no longer possible to accurately make a tracking correction using the burst A(83A) and burst B(83B).

SUMMARY OF THE INVENTION

The present invention solves the above-mentioned problem and it is an object of the invention to provide a servo pattern forming method for a floppy disk which method does not form an overlap write portion in writing servo patterns twice.

In the servo pattern forming method for a floppy disk according to the present invention, in order to achieve the above-mentioned object, writing is performed using a magnetic head having a magnetic head gap which is wider than the track pitch of the floppy disk, and there is used means whereby a surplus portion (a portion deviated from the track width) of a servo pattern written last time is erased at the time when a servo pattern is written next time to obtain a servo pattern substantially free from any overlap write portion.

According to the above means, the second writing for the floppy disk is only erasing the surplus portion of the servo pattern written at the first time. Thus, a servo pattern substantially free from any overlap write portion can be obtained by a relatively simple procedure.

DETAILED DESCRIPTION OF THE PREFERRED EMBODIMENTS

Embodiments of the present invention will be described hereinunder with reference to the accompanying drawings.

Figure 1:
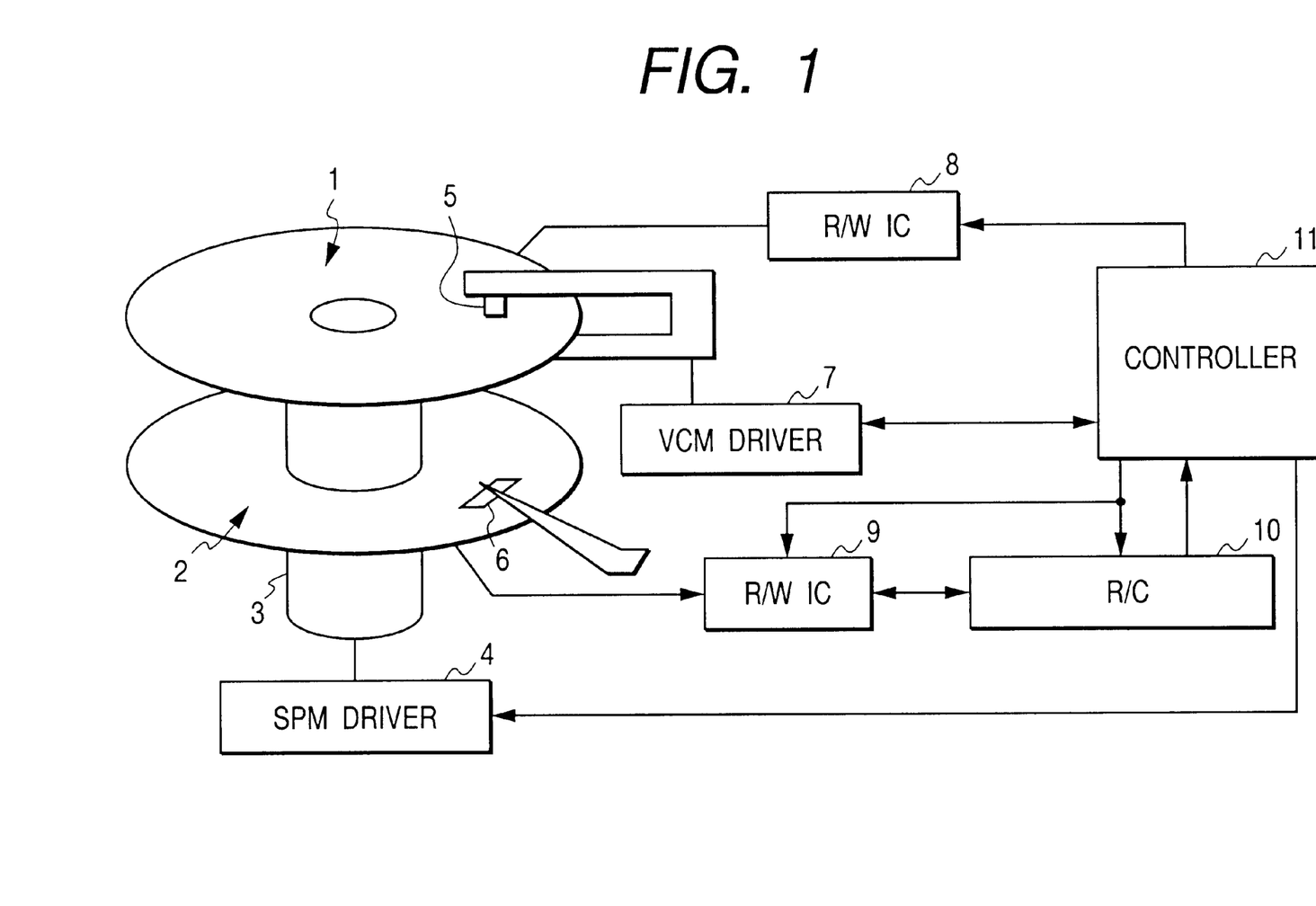
FIG. 1 is a block diagram showing a configuration example of a servo pattern writing system used in the servo pattern forming method for a floppy disk according to the present invention.

FIG. 1 is a block diagram showing a configuration example of a servo pattern writing system for use in practicing the servo pattern forming method for a floppy disk according to the present invention.

As shown in FIG. 1, the servo pattern writing system comprises a floppy disk 1 for writing servo patterns thereto, a hard disk 2 with clock signals written thereto, a spindle motor (SPM) 3 for rotating the floppy disk 1 and the hard disk 2 synchronously, a spindle motor (SPM) driver 4, a first magnetic head 5 having a magnetic gap wider than the track pitch Tp of the floppy disk 1 and disposed opposed to the floppy disk 1, a second magnetic head 6 disposed opposed to the hard disk 2, a voice coil motor (VCM) driver 7 for selective access of the first magnetic head 5 to the floppy disk 1, a first read/write integrated circuit (R/W IC) 8 which control read and write in the first magnetic head 5, a second read/write integrated circuit (R/W IC) 9 which controls read and write in the second magnetic head 6, a read channel (R/C) 10, and a controller 11 for controlling the operation of the entire system.

In the above configuration, when the spindle motor driver 4 is controlled to rotate the spindle motor 3, the floppy disk 1 and the hard disk 2 rotate synchronously. With this rotation, a clock signal read out by the second magnetic head 6 and is fed to the controller 11 through the second read/write integrated circuit 9 and read channel 10. In accordance with the clock signal thus fed the controller 11 produces servo pattern write data, write gate signal (WG) and write data enable signal (WDE) and provides them to the first magnetic head 5 through the first read/write integrated circuit 8.

Referring now to FIGS. 2A to 2D, 3A to 3C and 4A to 4B, which illustrate servo pattern writing orders in the first embodiment of the servo pattern forming method according to the present invention.

In these figures, a hatched portion 12 represents a data write portion, a white portion 13 represents a data erase portion, a lateral solid line portion 14 represents a track of the floppy disk 1, the reference mark WG represents a supply timing of the write gate signal and WDE represents the supply timing of the write data enable signal. A servo write head corresponds to the first magnetic head 5 shown in FIG. 5, having a magnetic gap wider than the track pitch Tp of the floppy disk 1.

Now, with reference to FIGS. 2A to 2D, 3A to 3C and 4A to 4B, the following description is now provided about the procedure of writing servo patterns to the floppy disk 1 using the first magnetic head (servo write head) 5.

Figure 2A:
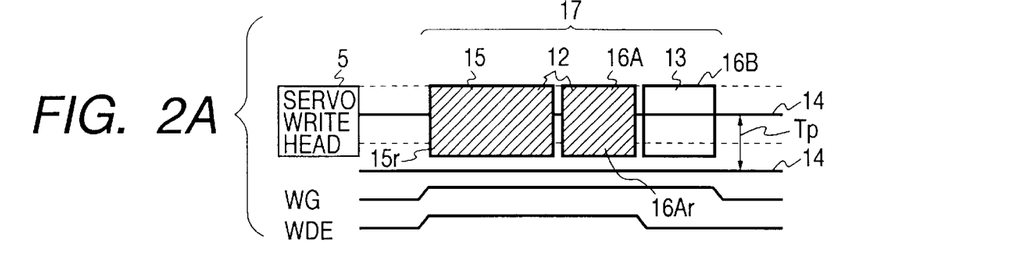
FIGS. 2A, 2B, 2C, and 2D are explanatory diagrams showing a first portion of a servo pattern writing order in the first embodiment of the servo pattern forming method according to the present invention.

First, as shown in FIG. 2A, with a center line 14 of one data track as a reference, servo information 15 which comprises the data write portion 12, burst A information 16A which also comprises the data write portion 12, and burst B information 16B which comprises the data erase portion 13, are written. In this case, the write gate signal WG is positive in polarity at the time of writing servo information 15, burst A information 16A and burst B information 16B, and the write data enable signal WDE is positive in polarity at the time of writing servo information 15 and burst A information 16A, but becomes negative in polarity at the time of writing burst B information 16B. The written servo information 15 and burst A information 16A extend partially as surplus information 15r, 16Ar up to the area adjacent thereto because the magnetic gap of the first magnetic head (servo write head) 5 is wider than the track pitch Tp.

Figure 2B:
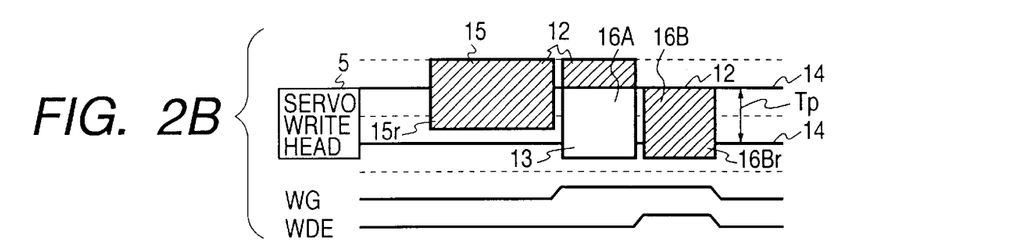

Next, as shown in FIG. 2B, the first magnetic head 5 is moved only a half track pitch (Tp/2) in the radial direction of the floppy disk 1 to write burst A information 16A which comprises the data erase portion 13 and burst B information 16B which comprises the data write portion 12. In this case, the write gate signal WG is positive in polarity at the time of writing burst A information 16A and burst B information 16B, and the write data enable signal WDE is negative in polarity at the time of writing burst A information 16A, but becomes positive in polarity at the time of writing burst B information 16B. In this writing operation, the surplus information 16Ar of burst A information 16A written last time is erased by writing of the data erase portion 13, and part of the newly-written burst B information 16B extends as surplus information 16Br up to the adjacent area.

Figure 2C:
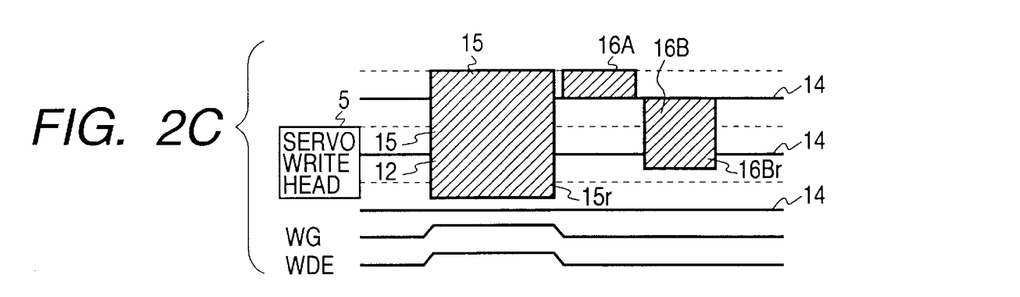

Next, as shown in FIG. 2C, the first magnetic head 5 is again moved only a half track pitch (Tp/2) in the radial direction of the floppy disk 1 to write the servo information 15 which comprises the data write portion 12, with the center line 14 of one data track as a reference. In writing the servo information 15, the write gate signal WG and the write data enable signal WDE become positive in polarity. In this writing operation, the surplus information 15r of the servo information 15 written last time is overwritten by the current servo information 15, and part of the current servo information 15 also extends as surplus information 15r up to the adjacent area.

Figure 2D:
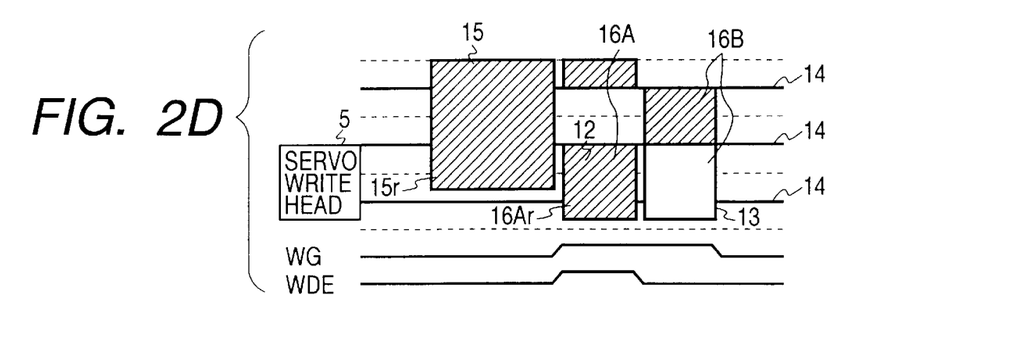

Subsequently, as shown in FIG. 2D, the first magnetic head 5 is again moved only a half track pitch (Tp/2) in the radial direction of the floppy disk 1 to write burst A information 16A which comprises the data write portion 12 and burst B information 16B which comprises the data erase portion 13. The write gate signal WG is positive in polarity at the time of writing burst A information 16A and burst B information 16B, and the write data enable signal WDE is positive in polarity at the time of writing burst A information 16A, but becomes negative at the time of writing burst B information 16B. In this writing operation, the surplus information 16Br of burst B information 16B written last time is erased by writing of the data erase portion 13 and part of the newly-written burst A information 16A extends as surplus information 16Ar up to the adjacent area.

Figure 3A:
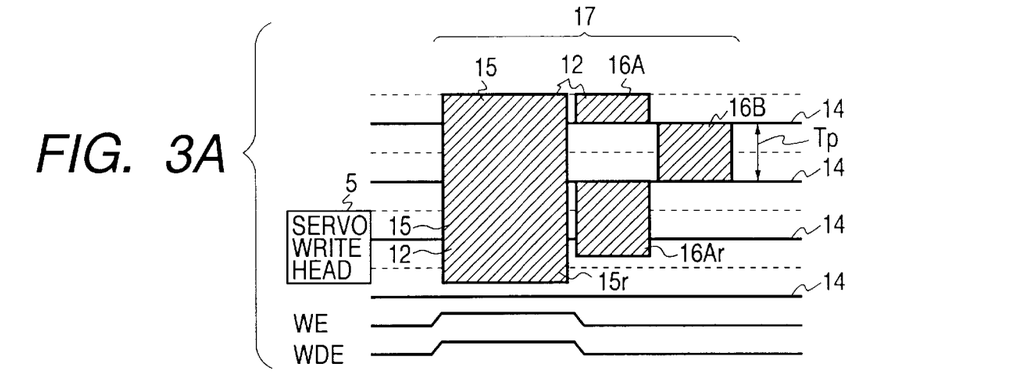
FIGS. 3A, 3B and 3C are explanatory diagrams showing a next portion of the servo pattern writing order in the first embodiment.

Next, as shown in FIG. 3A, the first magnetic head 5 is again moved only a half track pitch (Tp/2) in the radial direction of the floppy disk 1 to write servo information 15 which comprises the data write portion 12 with the center line 14 of the next one data track as a reference. The write gate signal WG and the write data enable signal WDE become positive in polarity at the time of writing the servo information 15. In this writing operation, the surplus information 15r of the servo information 15 written at the time before last is overwritten by the current servo information 15 and part of the current information 15 extends as surplus information 15r up to the adjacent area.

Figure 3B:
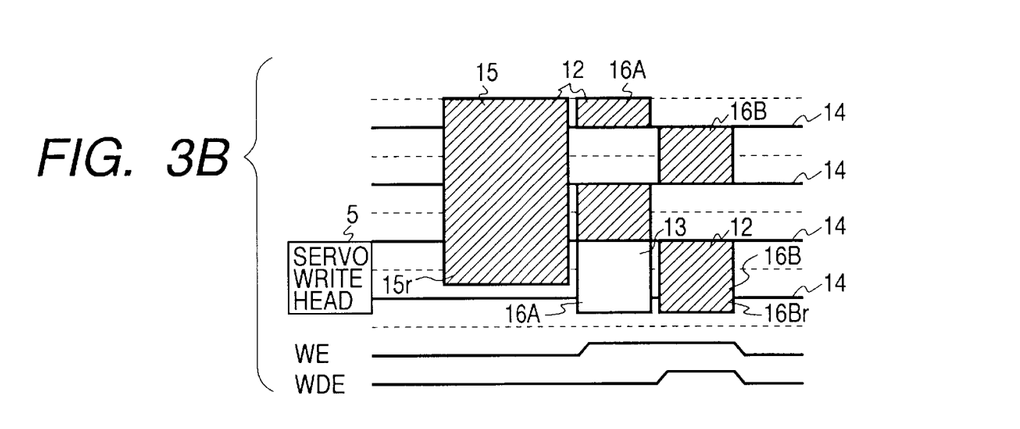

Then, as shown in FIG. 3B, the first magnetic head 5 is again moved only a half track pitch (Tp/2) radially of the floppy disk 1 to write burst A information 16A which comprises the data erase portion 13 and burst B information 16B which comprises the data write portion 12. The write gate signal WG is positive in polarity at the time of writing burst A information 16A and burst B information 16B, while the write data enable signal WDE is negative in polarity at the time of writing burst A information 16A, but becomes positive in polarity at the time of writing burst B information signal 16B. In this writing operation, the surplus information 16Ar of burst A information 16A written at the time before last is erased by writing of the data erase portion 13 and part of the newly-written burst B information 16B extends as surplus information 16Br up to the adjacent area.

Figure 3C:
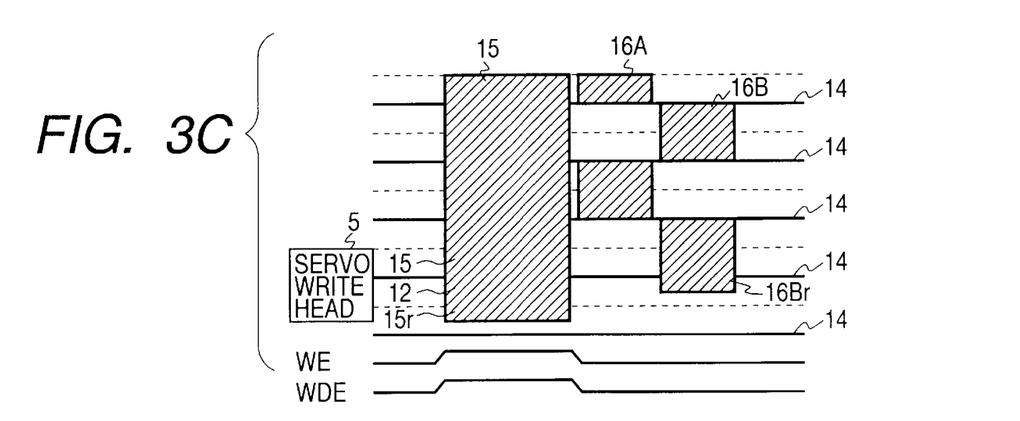

Subsequently, as shown in FIG. 3C, the first magnetic head 5 is again moved only a half track pitch (Tp/2) radially of the floppy disk 1 to write servo information 15 which comprises the data write portion 12 with the center line 14 of the next one data track as a reference. In writing the servo information 15, the write gate signal WG and the write data enable signal WDE become positive in polarity. In this writing operation, the surplus information 15r of the servo information 15 written at the time before last is overwritten by the current servo information 15 and part of the current servo information extends as surplus information 15r up to the adjacent area.

Figure 4A:
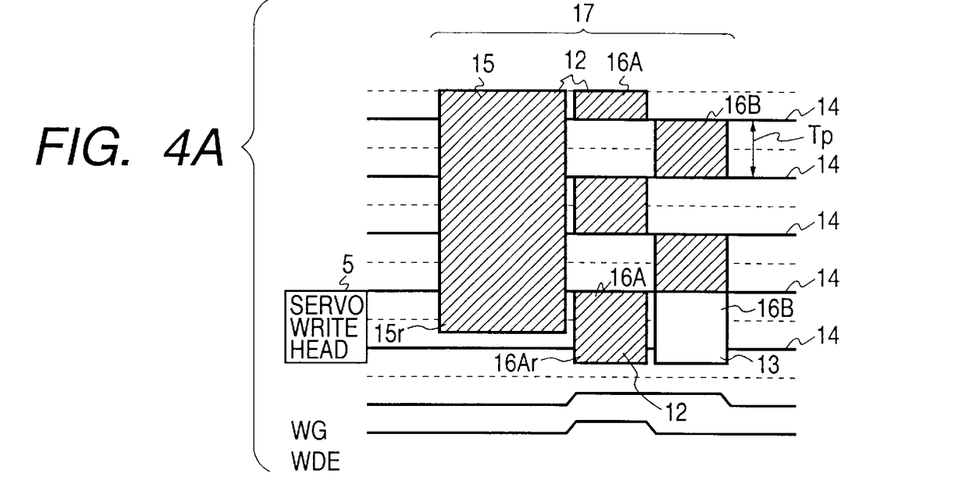
FIGS. 4A and 4B are explanatory diagrams showing a portion which further follows of the servo pattern writing order in the first embodiment.

Next, as shown in FIG. 4A, the first magnetic head 5 is again moved only a half track pitch (Tp/2) radially of the floppy disk 1 to write burst A information 16A which comprises the data write portion 12 and burst B information 16B which comprises the data erase portion 13. The write gate signal WG is positive in polarity at the time of writing burst A information 16A and burst B information 16B, and the write data enable signal WDE is positive in polarity at the time of writing burst A information 16A, but becomes negative in polarity at the time of writing burst B information 16B. In this writing operation, the surplus information 16Br of the burst B information 16B written at the time before last is erased by writing of the data erase portion 13 and part of the newly written burst A information 16A extends as surplus information 16Ar up to the adjacent area.

Figure 4B:
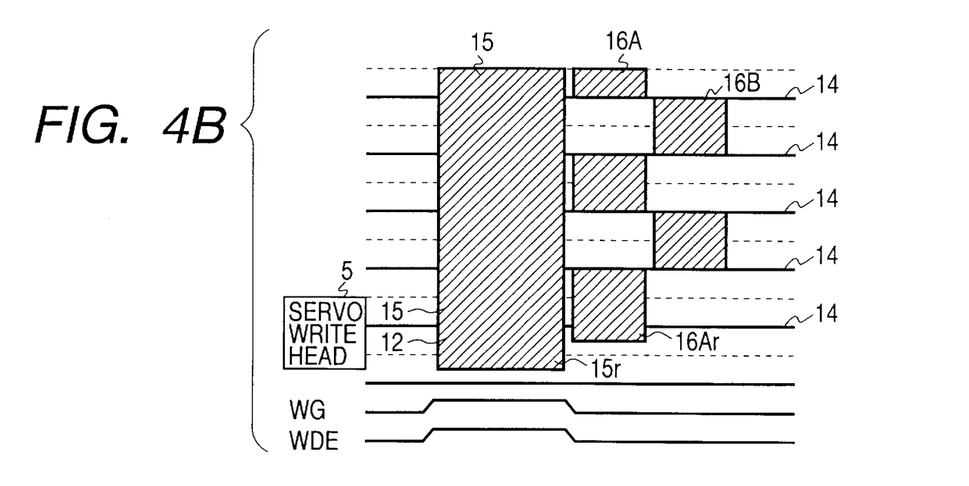
Figures 5A, 5B:
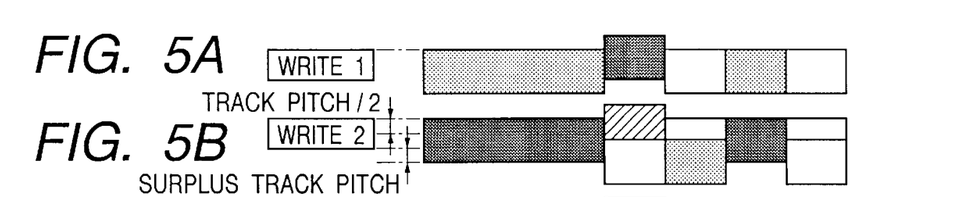
FIGS. 5A, 5B, 5C, 5D and 5E are explanatory diagrams showing a portion of a servo pattern writing order in the second embodiment of the servo pattern forming method according to the present invention.
Figures 5C, 5D:
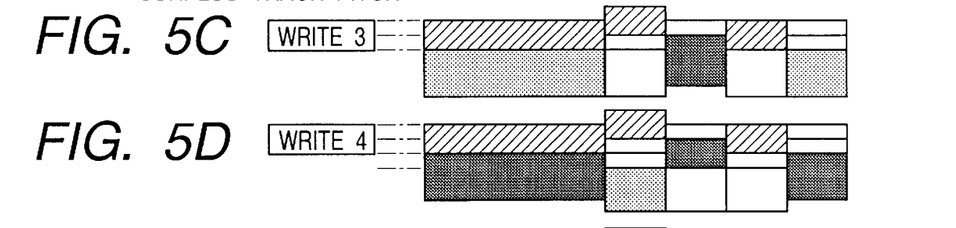
Figure 5E:
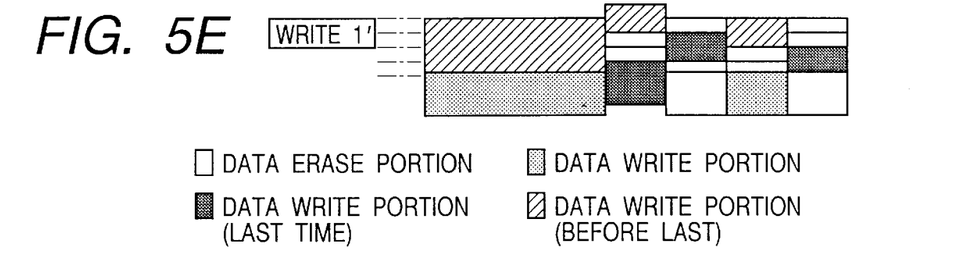
Figure 6A:
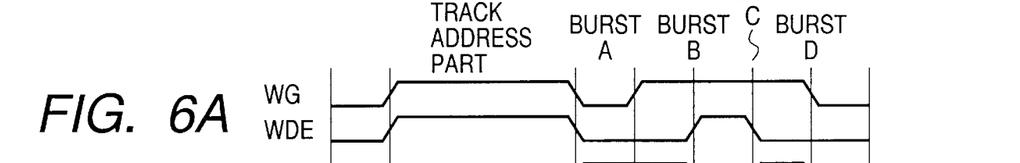
FIGS. 6A, 6B, 6C and 6D are characteristic diagrams showing open/close conditions of a write gate used in the second embodiment illustrated in FIG. 5.
Figures 6B, 6C:
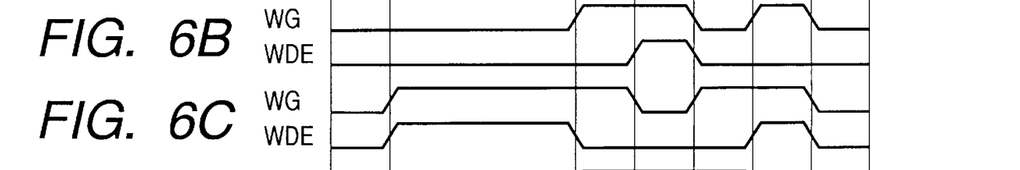
Figure 6D:
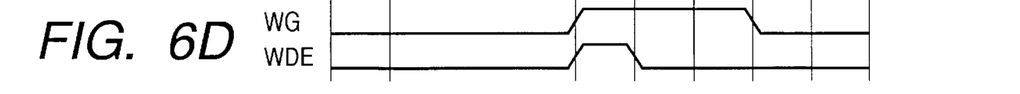

Then, as shown in FIG. 4B, the first magnetic head 5 is again moved only a half track pitch (Tp/2) radially of the floppy disk 1 to write servo information 15 which comprises the data write portion 12 with the center line 14 of the next one data track as a reference. The write gate signal WG and the write data enable signal WDE become positive at the time of writing the servo information 15. In this writing operation, the surplus information 15r of the servo information 15 written at the time before last is overwritten by the current servo information 15 and part of the current information 15 extends as surplus information 15r up to the adjacent area.

Also thereafter, the above writing operations are executed repeatedly, whereby a servo pattern 17 comprising servo information 15 and burst information 16A and 16B is formed on the floppy disk 1.

Thus, according to the servo pattern forming method for a floppy disk of the first embodiment, in the case of writing servo patterns twice to the floppy disk, the second write is merely erasing of the surplus portion of the servo pattern written first. Therefore, a servo pattern substantially free from any overlap write portion can be formed by a relatively simple procedure.

FIGS. 5A to 5E are explanatory diagrams showing a servo pattern writing order in the second embodiment of the servo pattern forming method for a floppy disk according to the present invention. FIGS. 6A to 6D are signal waveform diagrams showing a write gate signal WG supply timing in the second embodiment illustrated in FIG. 5.

The second embodiment is different from the first embodiment in that the first embodiment comprises two burst information pieces, i.e., burst A information 16A and burst B information 16B, whereas the second embodiment comprises four burst information pieces which are burst A information 16A, burst B information 16B, burst C information 16C and burst D information 16D and that in the first embodiment burst information 16 free of any overlap write portion is formed with respect to burst A information 16A and burst B information 16B, whereas in the second embodiment burst information 16 free of any overlap write portion is formed also with respect to burst C information 16C and burst D information 16D in addition to burst A information 16A and burst B information 16B. There is not found any other difference between both embodiments.

In the second embodiment, the procedure for writing the overlap write portion-free burst information 16 with respect to each of burst A information 16A, burst B information 16B, burst C information 16C and burst D information 16D, as well as the procedure for writing the overlap write portion-free servo information 15 with respect to servo information 15, are the same as the writing procedures described above in the first embodiment. Therefore, a further description is here omitted about the servo pattern forming method of the second embodiment.

Also as to the effect obtained in the second embodiment, there can be attained almost the same effect as in the first embodiment because the writing operations performed therein are the same as in the first embodiment.

What is claimed is:

1. A method of writing servo patterns to a floppy disk comprising a plurality of adjacently spaced data tracks each having a track width and a track centerline, said plurality of data tracks comprising a track pitch equal to the spacing between the centerlines of adjacent data tracks, wherein said method uses a magnetic head having a head gap wider than the track pitch of the floppy disk and comprises the sequential steps of:

positioning said magnetic head over a first data track so that a first edge of the magnetic head is aligned with an edge of the first data track and the second edge of the magnetic head is positioned over a portion of a second data track, said second data track being adjacent to said first data track;

simultaneously writing servo information to the first data track and a portion of the second data track;

moving said magnetic head by a distance equal to ½ of the track pitch so as to align said first edge of said magnetic head with the centerline of the first data track;

simultaneously writing burst information to a portion of the first data track and to a portion of the second data track, said burst information extending from the centerline of the first data track to past the centerline of the second data track;

moving said magnetic head by a distance equal to ½ of the track pitch so that the first edge of the magnetic head is aligned with an edge of the second data track and the second edge of the magnetic head is positioned over a portion of a third data track, said third data track being adjacent to said second data track;

simultaneously writing servo information to the second data track and a portion of the third data track, said servo information overwriting any servo information previously written in the second data track;

moving said magnetic head by a distance equal to ½ of the track pitch so as to align the first edge of the magnetic head with the centerline of said second track; and erasing the portion of the burst information extending past the centerline of the second data track.

2. A method according to claim 1, wherein the steps of writing servo information, writing burst information and erasing burst information are performed by supply timing data fed to said magnetic head in accordance with open/close timings of a write gate.

3. A method according to claim 1, wherein the steps of writing servo information, writing burst information and erasing burst information are performed by data fed to said magnetic head in accordance with a clock signal read from a hard disk which rotates synchronously with said floppy disk.

4. A method of writing servo patterns to a floppy disk comprising a plurality of adjacently spaced data tracks each having a track width and a track centerline, said plurality of data tracks comprising a track pitch equal to the spacing between the centerlines of adjacent data tracks, wherein said servo patterns comprise servo information written across said plurality of data tracks and first and second burst information pieces alternatively written between the centerlines of adjacent data tracks, wherein said method uses a magnetic head having a head gap wider than the track pitch of the floppy disk and comprises the sequential steps of:

a) positioning said magnetic head over a first data track so that a first edge of the magnetic head is aligned with an edge of the first data track and the second edge of the magnetic head is positioned over a portion of a second data track, said second data track being adjacent to said first data track;

b) simultaneously writing the servo information to the first data track and a portion of the second data track;

c) moving said magnetic head by a distance equal to ½ of the track pitch so as to align said first edge of said magnetic head with the centerline of the first data track;

d) simultaneously writing the first burst information piece to a portion of the first data track and to a portion of the second data track, said first burst information piece extending from the centerline of the first data track to past the centerline of the second data track, and erasing any second burst information piece extending between the centerline of the first data track and the centerline of the second data track;

e) moving said magnetic head by a distance equal to ½ of the track pitch so that the first edge of the magnetic head is aligned with an edge of the second data track and the second edge of the magnetic head is positioned over a portion of a third data track, said third data track being adjacent to said second data track;

f) simultaneously writing servo information to the second data track and a portion of the third data track, said servo information overwriting any servo information previously written in the second data track;

g) moving said magnetic head by a distance equal to ½ of the track pitch so as to align the first edge of the magnetic head with the centerline of said second track; and h) simultaneously writing the second burst information piece to a portion of the second data track and to a portion of the third data track, said second burst information piece extending from the centerline of the second data track to past the centerline of the third data track, and erasing any first burst information piece extending between the centerline of the second data track and the centerline of the third data track.

5. A method according to claim 4, wherein said servo patterns further comprise third and fourth burst information pieces alternatively written across adjacent data tracks, wherein step b) includes the step of writing said third burst information piece across the first data track and a portion of the second data track, and erasing any fourth burst information piece extending into the first data track, and step f) includes the step of writing said fourth burst information piece across the second data track and a portion of the third data track, and erasing any third burst information piece extending into the second data track.

* * * * *

UNITED STATES PATENT AND TRADEMARK OFFICE
CERTIFICATE OF CORRECTION

PATENT NO. : 6,031,674
DATED : February 29, 2000
INVENTOR(S) : Masashi Tabata

It is certified that error appears in the above-identified patent and that said Letters Patent is hereby corrected as shown below:

<u>Title page,</u>
Item [73], delete "," (comma) immediately after "Electric".

Signed and Sealed this

Sixteenth Day of April, 2002

Attest:

JAMES E. ROGAN
*Attesting Officer*     *Director of the United States Patent and Trademark Office*